United States Patent
Joshi et al.

(10) Patent No.: US 9,620,086 B1
(45) Date of Patent: Apr. 11, 2017

(54) DYNAMIC CONTRAST ADJUSTMENTS FOR GLYPH RENDERING

(71) Applicant: Amazon Technologies, Inc., Seattle, WA (US)

(72) Inventors: Lokesh Joshi, Mercer Island, WA (US); Yushu Cao, Seattle, WA (US); Hao Hu, Belmont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/752,026

(22) Filed: Jun. 26, 2015

(51) Int. Cl.
*G06T 11/00* (2006.01)
*G09G 5/28* (2006.01)
*G06T 11/20* (2006.01)

(52) U.S. Cl.
CPC .............. *G09G 5/28* (2013.01); *G06T 11/203* (2013.01); *G09G 2340/0428* (2013.01); *G09G 2340/0457* (2013.01)

(58) Field of Classification Search
None
See application file for complete search history.

(56) References Cited

U.S. PATENT DOCUMENTS

| | | | |
|---|---|---|---|
| 7,123,742 B2 * | 10/2006 | Chang | G06F 3/0321 358/3.28 |
| 7,639,258 B1 * | 12/2009 | Dowling | G06T 11/203 345/441 |
| 8,587,609 B1 * | 11/2013 | Wang | G06T 11/203 345/467 |

\* cited by examiner

*Primary Examiner* — Ashish K Thomas
(74) *Attorney, Agent, or Firm* — Eversheds Sutherland (US) LLP

(57) ABSTRACT

Systems, methods, and computer-readable media are disclosed for dynamic contrast adjustment for glyph rendering. Example methods may include rendering a first glyph associated with a font in a first font size, increasing a first contrast of the first glyph in the first font size by adjusting a first grayscale value associated with the first glyph in the first font size to generate an adjusted first grayscale value, and storing the adjusted first grayscale value in a grayscale mapping table associated with the font, the grayscale mapping table comprising a default grayscale value for the first glyph in a second font size. Example methods may include generating a font file comprising the first glyph and the grayscale mapping table.

20 Claims, 8 Drawing Sheets

DYNAMIC CONTRAST ADJUSTMENTS FOR GLYPH RENDERING

BACKGROUND

The continued proliferation of digital works has led to an increase in the availability of such works. Similarly, there has been an increase in the availability of electronic devices and applications used for consuming these works. For instance, users consume digital content, such as electronic books (eBooks), on an assortment of electronic devices. Electronic devices may include various types and sizes of displays, such as electronic ink displays and liquid crystal displays. Digital content may appear different on different electronic device displays. Accordingly, visual appearance of the same digital content may vary across different devices, resulting in reduced readability on certain electronic devices.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
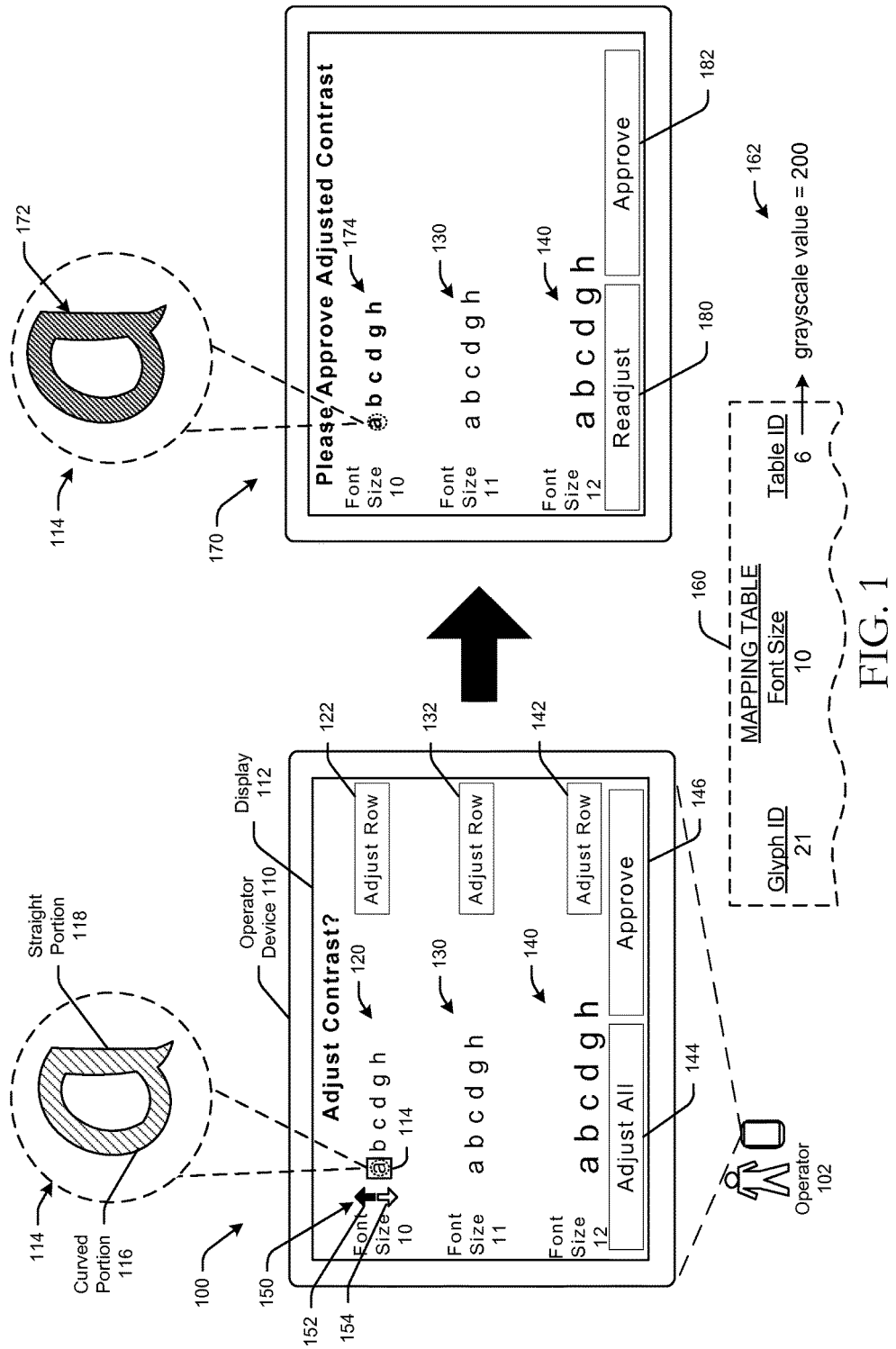
FIG. 1 is a schematic diagram of an example use case illustrating a dynamic contrast adjustment for a glyph rendering in accordance with one or more example embodiments of the disclosure.

This disclosure relates to, among other things, systems, methods, computer-readable media, techniques, and methodologies for dynamic contrast adjustments for glyph rendering. Users may consume digital content, such as text content, on electronic devices (also referred to herein as "user devices"). Electronic devices may have various display types or display sizes. Accordingly, certain digital content may be rendered or may otherwise appear differently on different devices. In one example, a visual contrast or appearance of text content may be different on an electronic device with an electronic ink ("e-ink") display than on an electronic device with a frontlit or backlit display. Further, fonts and font sizes may impact the appearance and readability of text content on a display of an electronic device.

Embodiments of the disclosure may facilitate dynamic contrast adjustments for glyph rendering, such that the visual contrast or readability of certain text content may be customized or improved on a particular electronic device. Further, because only certain types of text content, such as text of a certain font, or text at a certain font size, may be affected or may have a reduced contrast on a particular device, embodiments of the disclosure may independently adjust a contrast for a particular glyph, for a particular font size, and/or for a particular category or subcategory of glyphs. Contrast may be a difference in luminance or color that makes a representation of an object distinguishable, and may be determined by a difference in a color and brightness of the object and other objects within the same field of view. Accordingly, contrast adjustments for particular glyphs of a font may be facilitated by embodiments of the disclosure, as well as contrast adjustments for every glyph associated with a font. Embodiments of the disclosure may include color text, halftone text, and grayscale text, as well as related contrast adjustment functionality for respective text types. Embodiments of the disclosure may further be used by operators or users with contrast adjustment permissions to set or adjust default contrast values for particular glyphs or categories of glyphs on a particular device.

The systems, methods, computer-readable media, techniques, and methodologies for dynamic contrast adjustments for glyph rendering may facilitate contrast adjustments for individual or multiple glyphs of a font. For example, if only glyphs of a font size 12 and under are poorly visible or have insufficient contrast, embodiments of the disclosure may increase the contrast for those glyphs, while leaving the remaining glyphs at a default contrast. Further, embodiments of the disclosure may automatically identify and/or adjust a contrast for glyphs related to a glyph for which the contrast has been adjusted. For example, if the contrast for a glyph such as "b" in font size 16 has been adjusted by a particular amount, embodiments of the disclosure may identify a glyph such as "d" that has similar glyph features and may automatically adjust a contrast of "d" by the same amount. Glyph categories and/or subcategories, which may include glyphs having a certain level of similarity, may be generated by embodiments of the disclosure. For example, glyph categories may be generated based at least in part on a number of curves in a glyph, a slope of curves in a glyph, a length of curves in a glyph, a number of straight lines in a glyph, a length of straight lines in a glyph, and the like.

Embodiments of the disclosure may adjust a contrast value for one or more glyphs by modifying a grayscale value associated with the particular glyph or category of glyphs. Grayscale values may indicate a range of shading for pixels from white to black with numerical values. For example, grayscale values may range from 0-255, where a grayscale value of 0 may represent a black color and a grayscale value of 255 may represent a white color.

Referring now to FIG. 1, an example embodiment of a user interface 100 in accordance with one or more embodiments of the disclosure is illustrated. FIG. 1 also includes a user, such as an operator 102 and a user device or operator device 110. The operator 102 may be a master user or user with permissions to set and/or adjust default contrast values for one or more glyphs associated with a particular font by modifying at least one grayscale value associated with a particular glyph or category of glyphs. For example, the operator 102 may be a maker or manufacturer of the operator device 110, an author or developer of a particular font or mobile application, an author or publisher of digital content, or another user with permission to set and/or adjust default contrast values. In some embodiments, the operator 102 may not be a human, and may be a machine or apparatus configured to set and/or adjust contrast values. For example, the operator 102 may be a camera or other apparatus configured to determine an appearance of glyphs on a display of the operator device 110. The operator device 110 may be a user device or other configuration device that is configured to set and/or adjust default contrast values. For example, the operator device 110 may be a master device that may be used to configure default contrast values for particular glyphs. The user interface 100 may be presented to the operator 102 and access to the user interface 100 may be limited to users or operators with appropriate permissions in some embodiments. The operator 102 may desire to set and/or adjust one or more default contrast values for particular glyphs or categories of glyphs, or may desire to consume digital content, such as text, on a display 112 of the operator device 110. Example types of text content may include, without limitation, electronic books ("eBooks") or other electronic publications (e.g., magazines, comic books, Manga books, social media news feeds, documents, websites, other Internet content, etc.), or the like. Content may include text content, graphical content, audio content, video content, or the like, and may include information that is broadcast, streamed, or contained in computer files stored on a device configured to render the content. While example embodiments of the disclosure may be described in the context of eBooks and/or electronic reader ("e-reader") devices, it should be appreciated that the disclosure is more broadly applicable to any form of digital content consumable on any suitable user device including, without limitation, a smartphone, a tablet, a wearable device, a content streaming device, a digital media consumption device, a video game console, a set-top box, or any other suitable device. The display 112 may be any one of an e-ink display, a frontlit display, a backlit display, or another display, and may be of any dimension. For example, the display 112 may be dimensioned as a smartphone display, a tablet display, a laptop display, a desktop display, or another dimension.

In FIG. 1, the operator 102 may use the operator device 110 to consume, for example, an eBook on the display 112. Prior to presenting the eBook on the display 112, the operator device 110 may identify one or more fonts and/or glyphs used in the eBook. Glyphs may be symbols representative of readable characters that convey information to a user. More specifically, a glyph may be indicative of an individual letter or character of an alphabet, a number, a symbol, a punctuation mark, and/or another symbol. Glyphs may include glyph data that can be used by a renderer or rendering engine to generate lines and/or curves that form the glyph. Each font and/or typeface may include a set of one or more glyphs. A typeface, as described herein, may include a set of one or more fonts. Fonts may include one or more of a particular size, weight, and/or style of a typeface. For example, Times New Roman may be considered a typeface, and Times New Roman-Italics may be considered a font. "Font" and "typeface" may be used interchangeably herein. A glyph may be constructed in any number of font sizes, however, the glyph Upon determining which fonts and/or glyphs are used in the eBook, the operator device 110 may generate one or more glyph categories including groups of similar glyphs, as determined by one or more similarity metrics. For example, the operator device 110 may generate a glyph category of glyphs including glyphs with curved portions, such as "c" and "o." Curved portions may include any portions that form a glyph that are curved, such as Bezier curves. Bezier curves may be parametric curves used to form curved portions of some glyphs. In another example, the operator device 110 may generate a glyph category including glyphs with a number of curved portions within a certain range, such as equal to or greater than 1 curved portion and less than or equal to 2 curved portions, such as "a" and "u." The operator device 110 may further generate glyph categories, for example, for glyphs with both curved portions and straight portions, such as "b" and "d," as well as for glyphs having curved portions with certain slopes, or for glyphs having curved portions or straight line portions with certain lengths. Any of the glyph categories generated by the operator device 110 may be generated as subcategories of a glyph category. For example, a glyph category including all glyphs with only straight line portions may include a subcategory of glyphs with 2 straight line portions, such as "V," and another subcategory of glyphs with 3 straight line portions, such as "E" or "A." In the example of FIG. 1, the operator device 110 may generate a glyph category including glyphs with a range of 1 to 3 curved portions, which may include, among others, "a," "b," "c," "d," "g," and "h." For example, an "a" glyph 114 may include a curved portion 116 and a straight portion 118. Because the "a" glyph 114 includes between 1 and 3 curved portions, the "a" glyph 114 may be included in the glyph category.

Upon generating the glyph categories and/or subcategories, in some embodiments the operator device 110 may determine one or more font sizes for which a contrast adjustment is available. For example, the operator device 110 may determine that a font has a font size restriction threshold of 16 point size, indicating that font sizes of 16 and below are eligible for a contrast adjustment. In this example, font sizes over 16 points may not need contrast adjustments and may therefore be ineligible for contrast adjustments. In some embodiments, the font size restriction threshold value may not be included as eligible for a contrast adjustment (e.g., only font sizes below 16 point size are eligible in the example above). Accordingly, glyphs of a certain font size or font size range may be eligible for a contrast adjustment, while the same glyphs in a larger font size may be readily visible or may be readable without contrast adjustments. In some embodiments, all font sizes may be eligible for contrast adjustments.

In some embodiments, certain glyphs may be "thin" or may otherwise have thin portions, such that some or all of the glyph in a certain font size may appear washed out or may have low contrast on certain device displays. For example, the top portion of the glyph "a" may be relatively thin, and may have low contrast in some font sizes, making the glyph difficult to read. Thin glyphs may therefore be eligible for a contrast adjustment to make some or all of the respective glyph more contrasting and therefore easier to read. In one example, the operator device 110 may identify thin glyphs by identifying a minimum curve separation or stroke weight in an outline of a glyph. The minimum curve separation may be measured by calculating a difference between coordinates of various points along a curved portion of the glyph outline. If the minimum curve separation meets a thinness threshold, the operator device 110 may determine that the glyph is eligible for a contrast adjustment. The thinness threshold may be indicated by a distance value, a number of pixels, or another suitable metric indicative of a distance between two curved portions of a glyph.

Upon determining glyphs that are eligible for a contrast adjustment, the operator device 110 may render some or all of the glyphs on the display 112 of the operator device 110. In some embodiments, the operator device 110 may render individual glyphs, individual categories of glyphs, individual subcategories of glyph, or another set or subset of glyphs at the same time during a single screen on the display of the operator device 110. For example, in FIG. 1, the operator device 110 may determine that glyphs of the glyph category are eligible for contrast adjustments. The operator device 110 may render a portion of the glyph category including glyphs with a range of 1 to 3 curved portions. While example glyphs are depicted in FIG. 1 solely for illustration, it is understood that the glyph category may include additional glyphs, and that the depicted glyphs may not belong in any specific glyph category.

The operator device 110 may render some or all of the glyphs in the glyph category in any number of font sizes. For example, as shown in FIG. 1, the operator device 110 may generate a waterfall presentation of some of the glyphs in the glyph category. The waterfall presentation may include the set of glyphs rendered in a first font size on a first line 120. The waterfall presentation may further include the same set of glyphs rendered in a second font size, which may be greater than the first font size, on a second line 130, and in a third font size, which may be greater than the second font size, on a third line 140. The waterfall presentation may include glyphs rendered in any number of font sizes. In some embodiments, the number of font sizes may be limited by a font size restriction threshold, device hardware, digital media content (e.g., eBooks may have a set range of font sizes), and other factors. The operator device 110 may categorize and/or render only glyphs that are used in the digital content, or the eBook, or may categorize each glyph associated with the font. Similarly, the waterfall presentation may include only glyphs that are used in the eBook, or may include each glyph associated with a font.

In FIG. 1, the operator device 110 may render a portion of the glyphs of the identified glyph category that are eligible for contrast adjustments in a first font size of 10 points on the first line 120, in a second font size of 11 points on the second line 130, and in a third font size of 12 points on the third line 140. The font associated with the glyphs may have a font size restriction threshold of 12 points, accordingly, the operator device 110 may not render the glyphs in a font size greater than 12 points, such as a 14 point font size.

The operator device 110 may present contrast adjustment options for one or more glyphs of the fonts included in the eBook. Contrast adjustments may be implemented for individual glyphs or instances of glyphs (e.g., for a glyph at a particular font size), or may be implemented for entire categories of glyphs (e.g., for all glyphs with straight line portions). The contrast adjustment options may include a contrast increase option and/or a contrast decrease option. Contrast adjustments made to a particular glyph or group of glyphs may be automatically propagated to other glyphs in the same category as the glyph that was modified, in some embodiments.

As shown in FIG. 1, the operator device 110 may present a first row contrast adjustment option 122 to enable contrast adjustments for every glyph in the first line 120. The operator device 110 may present a second row contrast adjustment option 132 to enable contrast adjustments for every glyph in the second line 130. The operator device 110 may further present a third row contrast adjustment option 142 to enable contrast adjustments for every glyph in the third line 140. The operator device 110 may further present a contrast adjustment option for the entire category 144, and may present an approve option 146 for a user or an operator to approve the current contrast of one or more of the rendered glyphs. In some embodiments, the operator device 110 may present contrast adjustments for individual glyphs rendered on the display 112, for individual font sizes of glyphs rendered on the display 112 (e.g., for rows or lines of glyphs), for the entire category of glyphs rendered on the display 112, or for another set or subset of the rendered glyphs.

In FIG. 1, the operator 102 of the operator device 110 may select the individual "a" glyph 114 for a contrast adjustment. The operator 102 may select the glyph 114 via any suitable input method. The operator device 110 may receive an indication that a contrast for the "a" glyph 114 is to be adjusted. The operator device 110 may present contrast adjustment options 150, which may include an increase option 152 and a decrease option 154, for the "a" glyph 114. The contrast adjustment options 150 may be rendered anywhere on the display 112. The operator 102 may select the contrast increase option 152 and the operator device 110 may receive an indication to increase a contrast of the "a" glyph 114.

Upon receiving the indication to increase the contrast for the "a" glyph 114, the operator device 110 may identify one or more grayscale values associated with the "a" glyph 114. One or more pixels that represent a glyph may have a pixel value which describes a brightness and/or color of the pixel. The grayscale values associated with the "a" glyph 114 may represent shading of pixels that form the "a" glyph 114. For example, the operator device 110 may determine a glyph identifier associated with the "a" glyph and a font size associated with the particular instance of the "a" glyph for the contrast adjustment. Based at least in part on the glyph identifier and the font size, the operator device 110 may identify a mapping table 160 for the font. The operator device 110 may identify a table identifier comprising grayscale values for the "a" glyph 114 in the font size of 10 points, and may determine that a default grayscale value of the "a" glyph 114 is 220. The operator device 110 may modify a grayscale value of one or more pixels associated with the "a" glyph. For example, the operator device 110 may increase or decrease some or all of the grayscale values associated with the glyph identifier and the font size, in accordance with the contrast adjustment indications received by the operator device 110. In some embodiments, the glyph identifier may be associated with a particular table of grayscale values. In such instances, the operator device 110 may modify the particular table associated with the glyph identifier, or may associate a different table with the glyph identifier. The different table may include modified grayscale values in accordance with the contrast adjustments to the glyph. In some embodiments, contrast curves may be applied to one or more pixels, where contrast curves are selected from one or more predefined contrast curves. Contrast curves may be associated with particular grayscale values and may represent an average luminance of one or more pixels.

The operator device 110 may modify the grayscale values associated with the "a" glyph 114 by a predetermined increment. For example, in embodiments with a grayscale range of 0 to 255, the operator device 110 may modify grayscale values by increments of, for example, 1, 2, 5, 10, 15, 20, 25, or any other number of units. Each indication received by the operator device 110, for example, by a user continually selecting the contrast increase option, may trigger a subsequent incremental change in the contrast by adjusting the grayscale value incrementally. In FIG. 1, the operator device 110 may receive two indications to increase the contrast of the "a" glyph. A default grayscale value 162 associated with the "a" glyph may be 220, and the operator device 110 may adjust the contrast in increments of 10 units. Accordingly, in response to the two indications, the operator device 110 may modify the grayscale value from 220 to 200, thereby increasing a darkness of pixels forming some or all of the "a" glyph 114. In FIG. 1, as shown in a second user interface 170, the operator device 110 may render a contrast adjusted "a" glyph 172.

The operator device 110 may present options to propagate contrast adjustments to a single glyph or to a subset of the rendered glyphs across an entire glyph category. In some embodiments, the operator device 110 may automatically propagate the contrast adjustments across the entire glyph category or across an entire font size. For example, as shown in a second user interface 170 in FIG. 1, the operator 102 may have selected only the "a" glyph in the 10 point font size for the contrast adjustment. The operator device 110 may present an option to the operator 102 to propagate the contrast adjustment across the other glyphs, or may automatically propagate the contrast adjustments. For example, as shown in FIG. 1, the operator device 110 may automatically propagate the contrast adjustment to the "a" glyph 114 across each of the rendered glyphs in the same 10 point font size on the first line 120. Accordingly, a contrast adjustment may be made to each of the glyphs on the first line 120, and the adjusted glyphs may be rendered on an updated first line 174. In some embodiments, the propagated contrast adjustment may be an adjustment of −20 to some or all of the grayscale values associated with the other glyphs in the present example.

Upon determining a modified grayscale value for one or more of the rendered glyphs, the operator device 110 may render the modified glyphs with the modified grayscale values. The operator 102 may readjust one or more glyphs by selecting a readjust option 180, or may approve the appearance of the modified glyphs by selecting an approve option 182. If the operator 102 selects the approve option 182, the operator device 110 may receive a confirmation notification indicating that the operator 102 has approved the glyph contrast for the rendered glyphs.

Upon determining that the glyph contrast is approved, the operator device 110 may store the modified grayscale values for each of the modified and/or rendered glyphs. In some embodiments, the modified grayscale values may be stored in a grayscale mapping table that may be used by the operator device 110 to render the glyph with the modified grayscale values. The operator device 110 may associate the modified grayscale values with each of the respective glyph identifiers. The operator device 110 may generate a font file including the glyphs and the grayscale mapping table.

Example embodiments of the disclosure provide a number of technical features or technical effects. For example, in accordance with example embodiments of the disclosure, device-specific contrast adjustments to glyphs can be made and stored for future use. For example, text content may appear different on different displays. Embodiments of the disclosure may facilitate custom contrast adjustments for glyphs on specific devices, to facilitate visibility and readability of text on different devices. Embodiments of the disclosure may generate glyph categories including glyphs that are similar based at least in part on a similarity metric. Contrast adjustments to a glyph may be automatically propagated to other glyphs in the same category, reducing active user input needed to facilitate accurate contrast for various glyphs. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
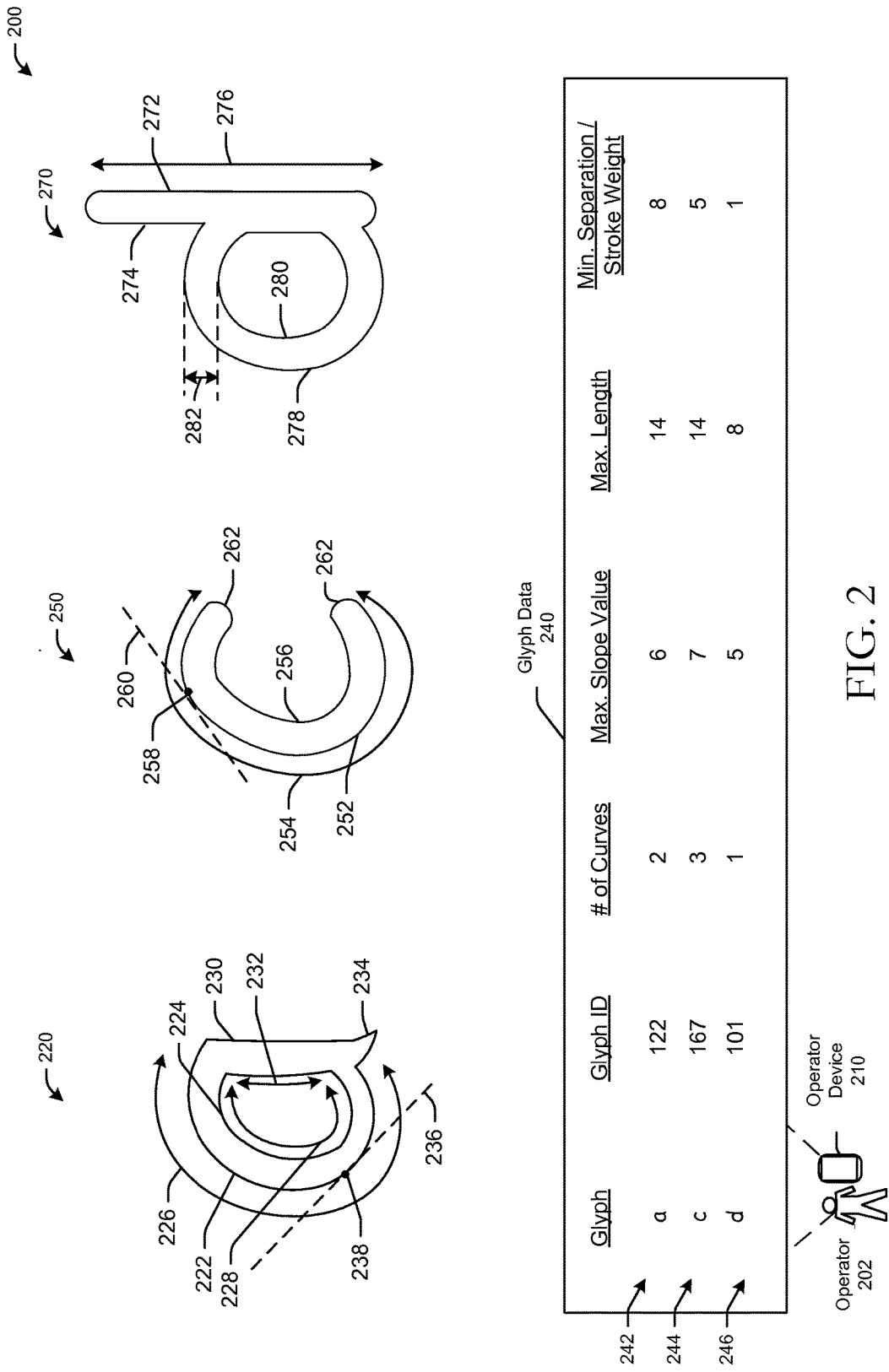
FIG. 2 is a schematic illustration of example glyph category generation in accordance with one or more example embodiments of the disclosure.

FIG. 2 depicts an embodiment 200 of example glyph category generation in accordance with one or more embodiments of the disclosure. In some embodiments, glyph categories or subcategories may be generated prior to adjusting a contrast for one or more glyphs, so as to facilitate optional propagation of contrast adjustments across some or all of a glyph category or subcategory. In other embodiments, glyph contrasts may be adjusted without the generation of categories or subcategories.

In FIG. 2, examples of glyph category generation are illustrated, along with an operator 202 and an operator device 210. The operator device 210 may be the same or different than the operator device 110 of FIG. 1. In a first example 220 of glyph category generation, the operator device 210 may generate a category of glyphs having a specific number or a specific range of curved portions. Curved portions of glyphs may be formed by Bezier curves. Curved portions of glyphs may have stroke weights that represent a thickness of a respective curved portion, and may be indicated by numerical values. Curved portion information for particular glyphs may be included in glyph data associated with the glyph. For example, in FIG. 2, curved portion information may be included in glyph data 240. The glyph data 240 may be included in font files, in some embodiments. In the first example 220, the operator device 210 may generate a glyph category of glyphs having a range of 1 to 3 curved portions. For example, the operator device 210 may analyze an "a" glyph 242 via a glyph identifier in the glyph data 240 to determine a number of curved portions included in the "a" glyph of the first example 220. The operator device 210 may determine that the "a" glyph has 2 curved portions. A first curved portion 222 may form an outer portion of an outline of the "a" glyph, and a second curved portion 224 may form an inner portion of the outline of the "a" glyph. In other embodiments, a number of curved portions of a glyph may be calculated using different methods, such as identifying a central axis about a glyph outline (e.g., rather than considering inner and outer portions of a glyph outline, considering corresponding portions as a single curve), identifying continuous curved portions, identifying discrete curved portions (e.g., a "B" glyph may have 2 curved portions), etc. In the example of FIG. 2, the first curved portion 222 may have a first curve length 226. Curve portion lengths or curve lengths may be a measurement of curve length between the endpoints of a particular curve. Similarly, the second curved portion 224 may have a second curve length 228. The glyph data 240 may further indicate that the "a" glyph 242 has 1 straight line portion 230, which may be a stem width in some embodiments, that may form a right edge of the "a" glyph. The straight line portion 230 may be formed by an inner and outer straight line portion along the glyph outline. The straight line portion 230 may have a straight line length 232 that may be measured along the inner outline portion or the outer outline portion of the glyph outline. The glyph data 240 may further indicate that the "a" glyph 242 includes a serif 234, and has a maximum curve slope 236 of a particular value. The maximum curve slope 236 may be determined by the operator device 210 or may be included in the glyph data 240. The maximum curve slope value may be a number which is used to indicate the steepness of a curve at a particular point. The slope of a curve at a point is defined to be the slope of the tangent line. The slope value of a curve at a point may be identified by calculating a derivative. In FIG. 2, a tangent line 236 may be used to identify a maximum slope value at a point 238.

The operator device 210 may generate a glyph category with a first group of glyphs in a particular font size having a number of curved portions within a range of curved portion values. The operator device 210 may determine that the "a" glyph has 2 curved portions and therefore is within the range of curved portions. The operator device 210 may therefore include the "a" glyph in the glyph category.

In a second example 250 of glyph category generation, the operator device 210 may generate a category of glyphs having a particular curve slope value or range of curve slope values. In some embodiments, the operator device 210 may generate a subcategory of a glyph category rather than generating a glyph category. For example, the operator device 210 may analyze a "c" glyph 244, which may be included in the glyph data 240, and determine curve slope values associated with the "c" glyph 244. Such curve slope values may include a maximum curve slope value, average curve slope values, minimum curve slope values, or other slope values. While the "c" glyph 244 may be included in the same glyph category as the "a" glyph 242 because of the number of curved portions in the "c" glyph 244, the operator device 210 may generate a subcategory with glyphs having particular curve slope values or a range of curve slope values, such as a maximum curve slope value of 6. Accordingly, the operator device 210 may generate a subcategory including the "c" glyph 244.

The "c" glyph 244 may include a first curved portion 252 with a first curve length 254, and a second curved portion 256 that form a glyph outline of the "c" glyph 244. The first curved portion 252 and the second curved portion 256 may be connected by end curved portions 262 to complete the glyph outline. The "c" glyph 244 may have a maximum slope value at a point 258 indicated by a tangent line 260.

In some embodiments, the operator device 210 may automatically generate a category or subcategory of glyphs upon detecting a certain level of similarity or dissimilarity between glyphs. For example, the operator device 210 may determine that a difference between a first curve slope value 236, such as the maximum curve slope value, of a first curve of the "a" glyph 242 and a second curve slope value, such as the maximum curve slope value 260 of a second curve of the "c" glyph 244 meets a subcategory generation threshold. The subcategory generation threshold may indicate a tolerance within which glyphs of a category may have for particular glyph features. For example, a subcategory generation threshold may indicate +/−1 for a difference in number of straight line portions for glyphs of a certain category. If the tolerance is exceeded, the operator device 210 may generate a subcategory of the glyph category with the glyphs that exceed the tolerance.

The operator device 210 may further generate glyph categories or subcategories for glyphs having certain curved portion lengths or straight line lengths. For example, the operator device 210 may determine that a difference between a first curve length value of a first curve of the first glyph and a second curve length value of a second curve of the second glyph meets a subcategory generation threshold, and the operator device 210 may generate subcategories, or categories, for respective glyphs in a glyph category.

The operator device 210 may further generate glyph categories or subcategories for glyphs based at least in part on curved portion slopes. For example, the operator device 210 may determine that a difference between a first curve slope value of a first curve of a first glyph and a second curve slope value of a second curve of a second glyph meets a subcategory generation threshold, and the operator device 210 may generate subcategories, or categories, for respective glyphs in a glyph category.

In a third example 270 of glyph category generation, the operator device 210 may generate a glyph category, or a subcategory, for glyphs having a certain number or range of straight line portions, or for glyphs having both curved portions and straight line portions. For example, the operator device 210 may determine that a "d" glyph 246 has 1 straight line portion, as indicated by outer straight line portion 272 and inner straight line portion 274 on the illustrated glyph outline. The outer straight line portion 272 may have a line length 276. The "d" glyph may further include an outer curved portion 278 and an inner curved portion 280 forming the glyph outline. The "d" glyph 246 may further have a minimum curve separation 282 or a stroke weight that is measured, determined, or calculated at a point of least distance between two curves of the "d" glyph, such as between a top portion of the outer curved portion 278 and the inner curved portion 280. The operator device 210 may generate a glyph category with a first group of glyphs in a font size having a number of straight line portions within a range of straight line portion values. In another example, straight line length may be considered in generating glyph categories or subcategories.

In addition, in some embodiments, contrast adjustment eligibility may be determined prior to adjusting a contrast for one or more glyphs. For example, some glyphs may be associated with a font size restriction threshold indicative of which font sizes or font size ranges are eligible for contrast adjustments. In some embodiments, glyphs having a certain minimum curve separation distance or stroke weight that satisfies a thinness threshold may be eligible for contrast adjustments. Other embodiments may not include any restrictions, such that all glyphs are eligible for contrast adjustments.

In an example embodiment, a user device may identify a font size restriction value associated with a font. The font size restriction value may be associated with a font file. The font size restriction value may be indicative of a maximum font size at which a contrast is adjustable. The user device may determine that a font size is less than or equal to the font size restriction value prior to presenting contrast adjustment options for a font. In another example, a user device may determine a minimum curve separation distance between a first curve and a second curve of the first glyph. In some embodiments the user device may calculate the difference by analyzing glyph outlines, while in other embodiments the information may be stored or accessible via font information or a font file. The user device may determine that the minimum curve separation distance meets a contrast adjustment threshold prior to rendering the first glyph or presenting contrast adjustment options.

Figure 3:
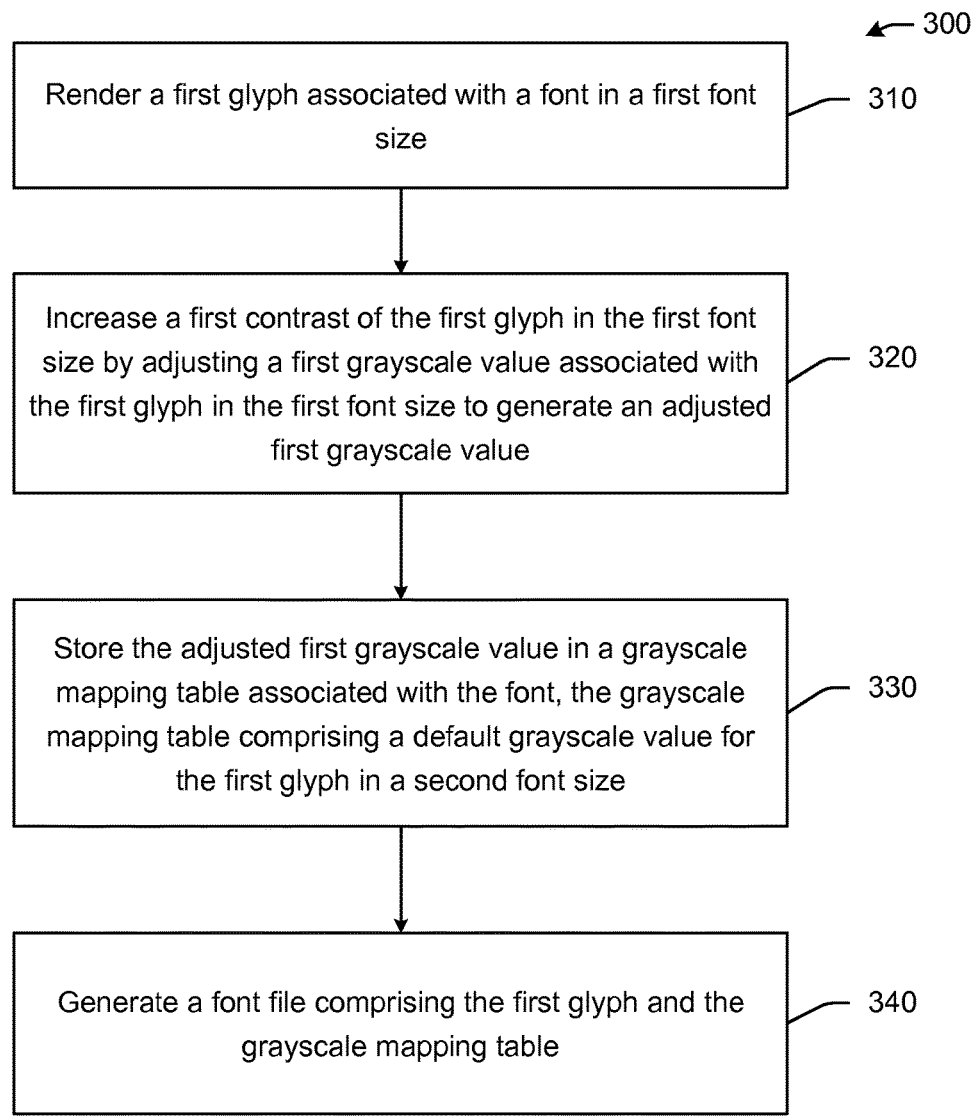
FIG. 3 is a process flow diagram of an illustrative method for dynamic contrast adjustments for glyph rendering in accordance with one or more example embodiments of the disclosure.
Figure 4:
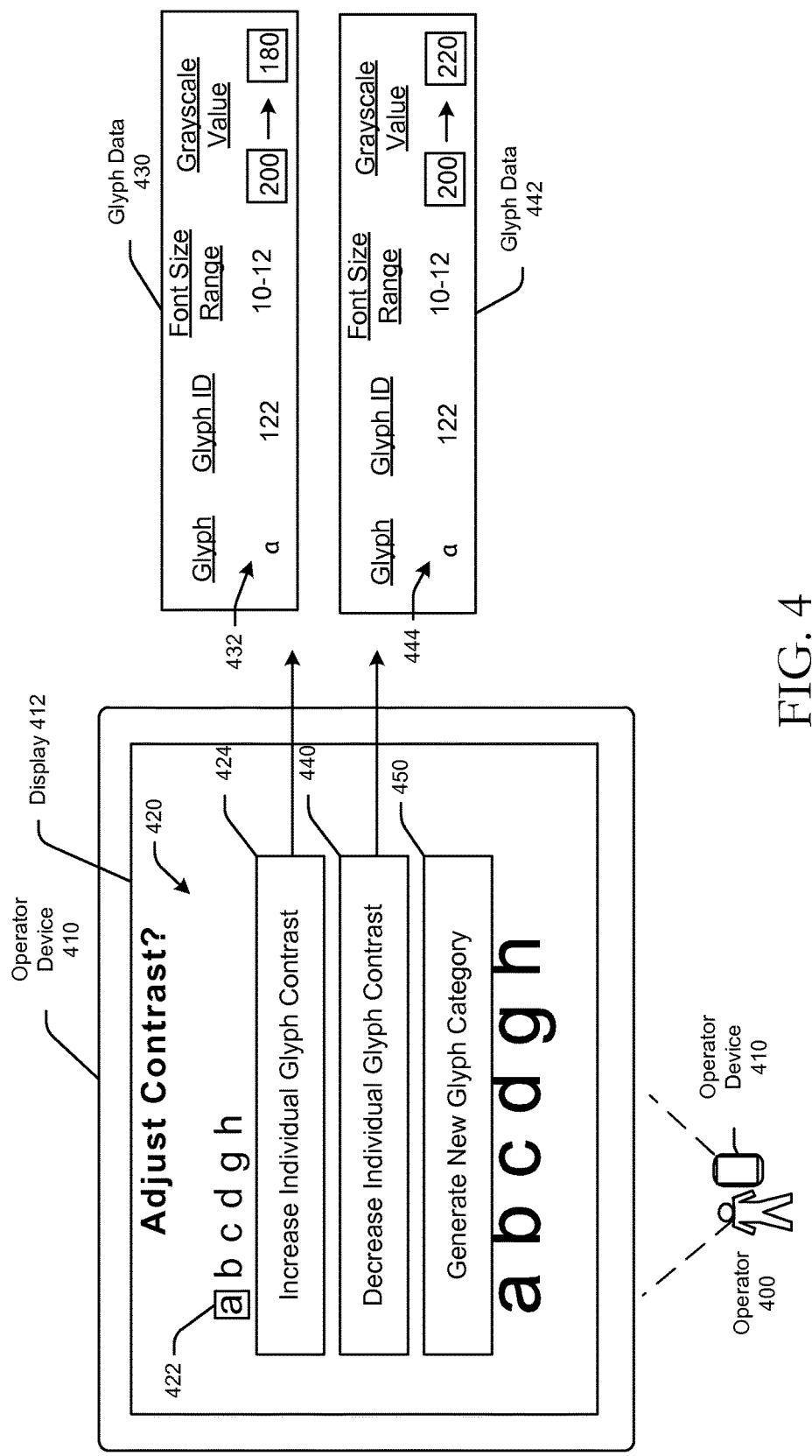
FIG. 4 is a schematic illustration of an example use case for dynamic contrast adjustments for glyph rendering in accordance with one or more example embodiments of the disclosure.

FIG. 3 is a process flow diagram of an illustrative method 300 for dynamic contrast adjustments for glyph rendering in accordance with one or more example embodiments of the disclosure. FIG. 4 illustrates an example use case for dynamic contrast adjustments for glyph rendering in accordance with the method 300 of FIG. 3, and will be discussed in conjunction with the description of FIG. 3.

Figure 8:
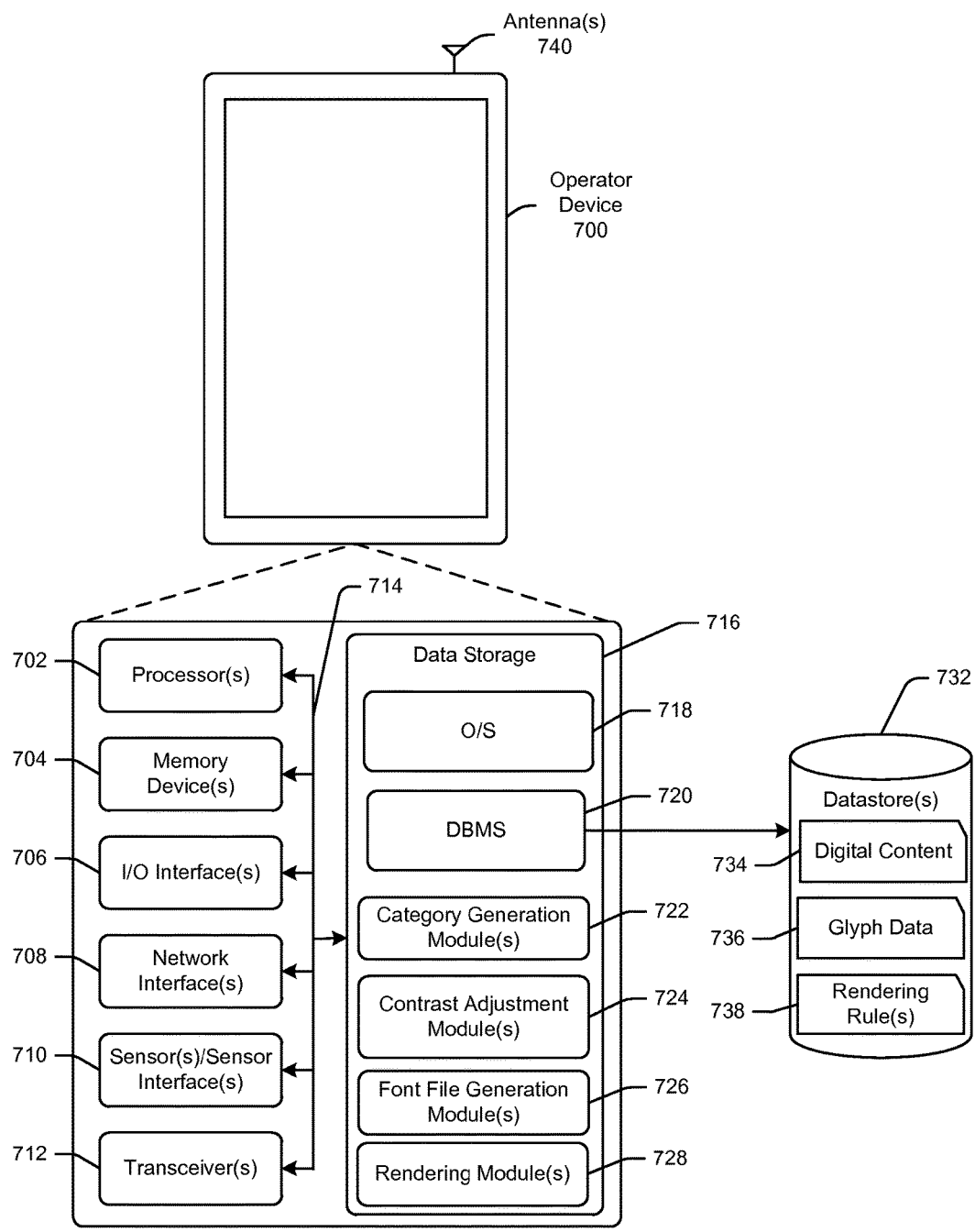
FIG. 8 is a schematic block diagram of an illustrative user device in accordance with one or more example embodiments of the disclosure.

At block 310 of the method 300 in FIG. 3, computer-executable instructions of one or more module(s) stored on a memory of a user device may be executed to render a first glyph associated with a font in a first font size. Example device architecture, including modules, is illustrated in FIG. 8.

In FIG. 4, an example operator device 410 is depicted with an operator 400. The operator device 410 may include a display 412. The operator device 410 may be, for example, the operator device 110, 210 of FIGS. 1-2. The operator device 410 render glyphs 420 on the display 412. The operator device 410 may render one or more glyphs in one or more font sizes, such as in a waterfall presentation. Glyphs may be rendered in a first font size on a first line of text, in a second font size on a second line of text, and so forth.

At block 320 of the method 300 in FIG. 3, computer-executable instructions of one or more module(s) stored on a memory of a user device may be executed to increase a first contrast of the first glyph in the first font size by adjusting a first grayscale value associated with the first glyph in the first font size to generate an adjusted first grayscale value.

In FIG. 4, the operator 400 may select a first glyph 422 for which to make a contrast adjustment. The operator device 410 may receive an indication of the selection of the first glyph 422. The operator device 410 may present a first option 424 to increase individual glyph contrast, a second option 440 to decrease individual glyph contrast, a third option 450 to generate a new glyph category or exceptions (e.g., for punctuation marks, etc.), and the like. Other embodiments may present additional or fewer, or different, options that those illustrated in the example of FIG. 4.

The operator 400 may select the first option 424 to increase the individual glyph contrast of the first glyph 422, and the operator device 410 may receive a request to increase a contrast of the first glyph 422. In response to the request, the operator device 410 may increase the contrast by adjusting a grayscale value associated with the first glyph in the first font size to generate an adjusted grayscale value. For example, the operator device 410 may identify glyph data 430 associated with the first glyph 422 in the font size 432, and may reduce a first grayscale value of the first glyph 422 by an incremental amount. For example, the operator device 410 may reduce one or more grayscale values associated with the first glyph 422 by an increment of 20 units, from a value of 200 to a modified or adjusted grayscale value of 180.

Alternately, if the operator 400 selected the second option 440 to decrease the individual glyph contrast, the operator device 410 may identify glyph data 442 associated with the first glyph 422 in the font size 444, and may increase a first grayscale value of the first glyph 422 by the incremental amount, such as by 20 units. Accordingly, the operator device 410 may adjust the grayscale value from 200 to 220. In some embodiments, the operator device 410 may automatically propagate contrast adjustments across one or more other glyphs in the same glyph category or subcategory as the first glyph 422.

Upon adjusting the contrast for a particular glyph or set of glyphs, the operator device 410 may render the glyphs with the modified grayscale values. The operator device 410 may request approval of the modified grayscale value(s). The operator 400 may confirm or approve the contrast and/or visibility of the modified glyphs and the operator device 410 may receive a confirmation indication confirming that the grayscale value(s) is approved. The operator device 410 may assign the adjusted grayscale value(s) to the glyphs, such as the first glyph 422, in a grayscale mapping table.

At block 330 of the method 300 in FIG. 3, computer-executable instructions of one or more module(s) stored on a memory of a user device may be executed to store the adjusted first grayscale value in a grayscale mapping table associated with the font, the grayscale mapping table comprising a default grayscale value for the first glyph in a second font size. The operator device 410 may store the adjusted grayscale value in a grayscale mapping table associated with the font. The grayscale mapping table may include a default grayscale value for the first glyph 422 in a second font size.

At block 340 of the method 300 in FIG. 3, computer-executable instructions of one or more module(s) stored on a memory of a user device may be executed to generate a font file comprising the first glyph and the grayscale mapping table. In FIG. 4, the operator device 410 may generate a font file with the first glyph 422 and the grayscale mapping table. In some embodiments, the operator device 410 may determine that the font is a true type font, and may modify a true type grayscale value of the first glyph to correspond to the adjusted first grayscale value.

The operator device 410 may receive a render request to render text content on the display 412 of the operator device 410. The operator device 410 may determine that the text content includes the first glyph 422 in the same font size, and as a result, the operator device 410 may render the text content with the grayscale mapping table by rendering the first glyph 422 with the adjusted grayscale value.

Figure 5:
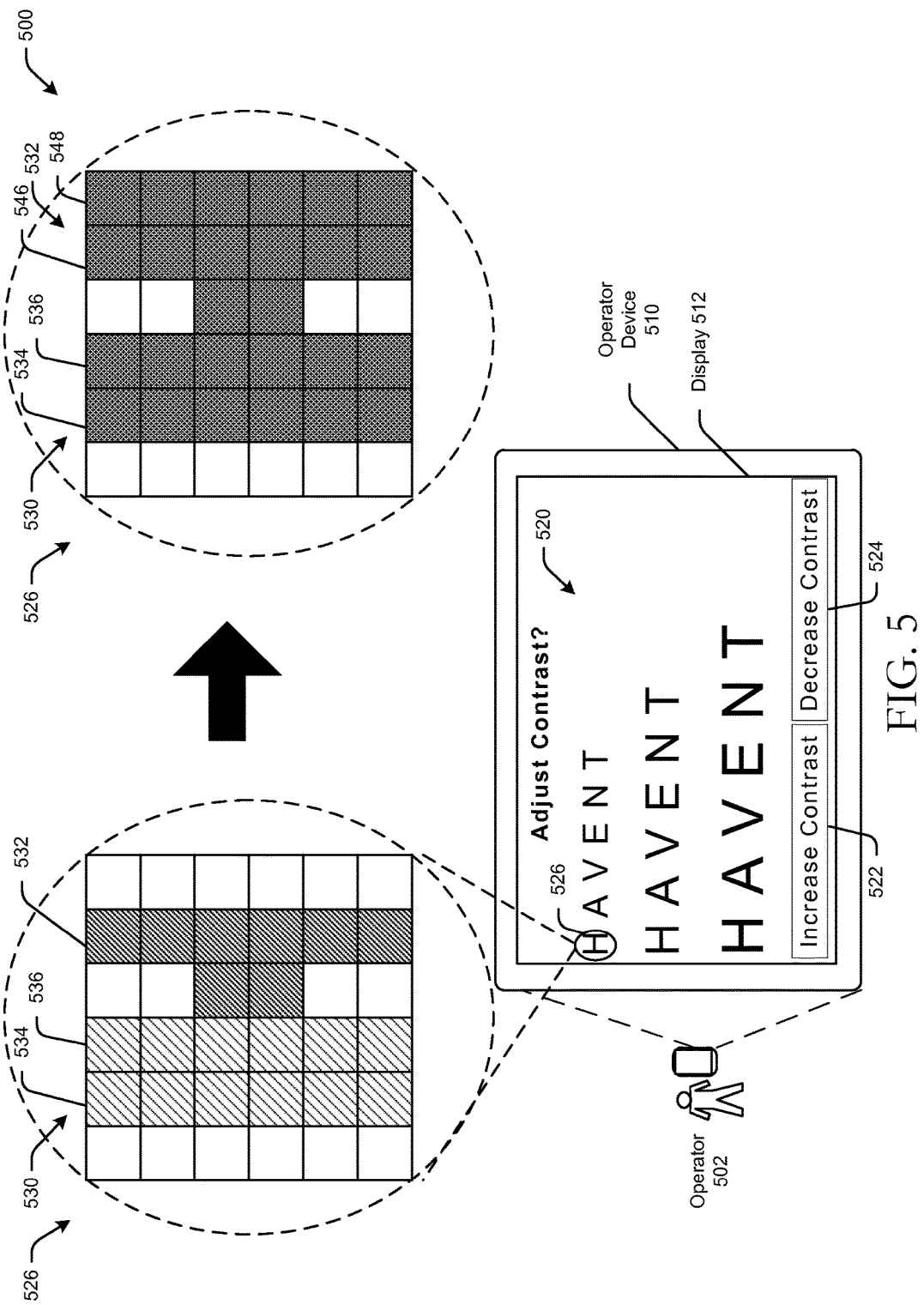
FIGS. 5-6 are schematic illustrations of example use cases for symmetric contrast adjustments for glyph rendering in accordance with one or more example embodiments of the disclosure.

FIG. 5 illustrates an example embodiment 500 of symmetric contrast adjustment for glyphs with an operator 502 and an operator device 510 in accordance with one or more embodiments of the disclosure. A glyph outline may be a series of closed contours made of a series of line segments and Bezier curves. Glyph outlines may be processed, for example via grid-fitting or other transformations, and pixel dimensions for the glyph may be calculated. A scan converter or scan-line converter may draw the pixels using the default and/or modified grayscale values for the glyph. In some instances, glyph edges may not align with a pixel grid of the display, which may result in a fuzzy or hazy edge and reduced overall glyph contrast. In such instances, embodiments of the disclosure may increase a contrast of a glyph edge by darkening or lightening pixels at the misaligned glyph edge. To ensure uniformity, some embodiments may similarly adjust a contrast of another glyph edge, such as the opposing glyph edge.

For example, the operator device 510, which may be the same or different that the operator devices 110, 210, 410, may render a set of glyphs 520 on a display 512 of the operator device 510. The operator device 510 may present a first option 522 to increase contrast and a second option 524 to decrease contrast of one or more rendered glyphs. The set of glyphs 520 may include glyphs with at least two straight line portions and 0 curved line portions. A first glyph 526, which may be an "H" glyph, may have a first stem 530 and a second stem 532 forming portions of the first glyph 526. The second stem 532, or the right stem, of the glyph 526 may be aligned with the pixel grid of the display 512. The first stem 530, however, may not be aligned with the pixel grid of the display 512. As a result, the left stem, or the first stem 530, of the glyph 526 may stretch across a first pixel column 534 and a second pixel column 536. Contrast values or grayscale values for the first pixel column 534 and the second pixel column 536 may be reduced to compensate for the spillage into adjacent pixel columns. As a result, the first stem 530 may appear fuzzy or hazy to the operator 502.

Embodiments of the disclosure may compensate for such misaligned portions of glyphs by symmetrically adjusting a contrast of different portions of the glyph. For example, the operator 502 may desire to increase a contrast of the first glyph by selecting the first option 522. In response, the operator device 510 may adjust a contrast of both columns of the first stem 530 of the first glyph 526. Specifically, the operator device 510 may increase a contrast of the first column 534 and the second column 536, such that the first stem 530 is uniform in contrast. The operator device 510 may further increase a contrast of the remainder of the first glyph 526, such as the second stem 532, such that the entire glyph is uniform in contrast in this example. In other examples, grayscale values may not be uniform for certain glyphs. The operator device 510 may further extend the second stem 532 across a third pixel column 546 and a fourth column 548, so as to generate a symmetric glyph with the desired contrast in accordance with the operator's 502 settings. In another example, the operator device 510 may determine that a first edge of a glyph outline of the first glyph in a font size is positioned within a first pixel of the display, such that the pixel or pixel column has a reduced contrast. The operator device 510 may automatically increase or adjust a second grayscale value for a second pixel at which a second edge, that may be opposite the first edge, of the first glyph is positioned. Because the rendered glyphs 520 of FIG. 5 include glyphs with straight line portions, a likelihood of reduced visibility or washing out of any one of the glyphs may be reduced due to the straight line portions. Accordingly, embodiments of the disclosure may bias any incremental adjustment to contrast to a relatively light contrast with respect to curved glyphs, so as to avoid a difference in contrast between glyphs with straight lines and glyphs with curved portions. For example, embodiments of the disclosure may reduce an increment by which adjustments to grayscale values are made for each adjustment indication received by the device. In one example, a contrast adjustment for a straight line glyph may adjust grayscale values for the straight line glyph by 5 units, while contrast adjustments for curved line glyphs may adjust grayscale values for the curved line glyph by 10 units.

Figure 6:
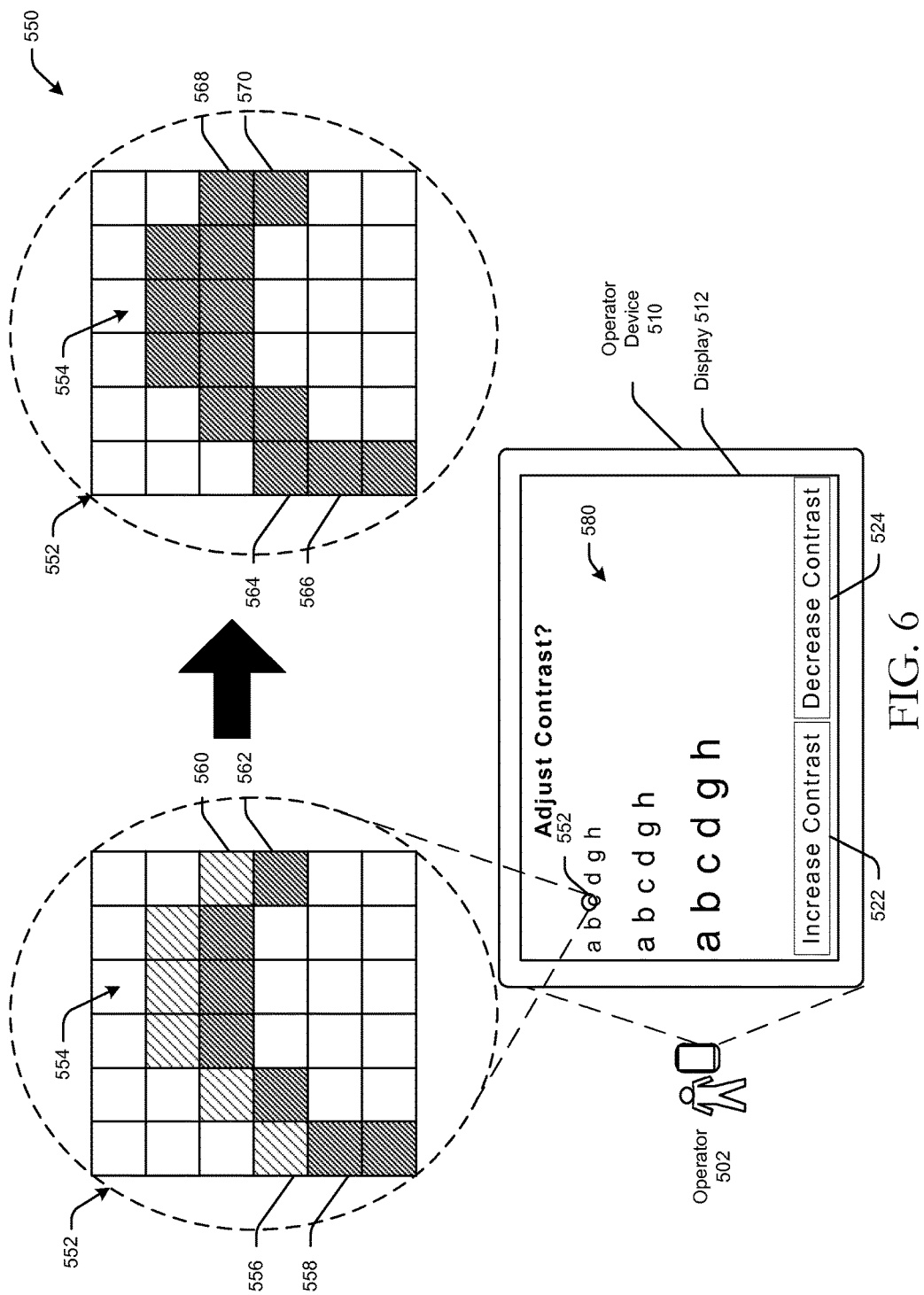

FIG. 6 illustrates another example embodiment 550 of the disclosure of contrast adjustment for glyphs with the operation 502 and the operator device 510 of FIG. 5. In FIG. 6, a set of glyphs with curved line portions 580 may be rendered on the display 512. The operator 502 may desire to adjust a contrast of the rendered category of glyphs 580. As shown in FIG. 6, a detailed view of a portion 552 of a "c" glyph may include a curved line portion 554. The curved line portion 554 may be rendered with pixels of different grayscale values, which may appear hazy to the operator 502. For example, an upper part of the curved line portion 554 may include a first pixel 556 with a first grayscale value that is adjacent to a second pixel 558 with a second grayscale value that is less than the first grayscale value, such that the second pixel 558 appears darker than the first pixel 556. Similarly, a third pixel 560 with a third grayscale value, that may be the same or different than the first grayscale value, may be adjacent to a fourth pixel 562 with a fourth grayscale value (that may be the same or different than the second grayscale value) that is less than the third grayscale value, such that the fourth pixel 562 appears darker than the third pixel 560. If the operator 502 desires to increase contrast of the rendered glyphs 580, the operator device 510 may bias towards relatively higher changes in grayscale value because the glyphs include curved portions, unlike the straight line glyphs of FIG. 5. Accordingly, an incremental adjustment to grayscale values for curved glyphs may be greater than incremental adjustments to grayscale values for straight line glyphs. In FIG. 6, the "c" glyph 552 with increased contrast may include adjustments to some or all grayscale values forming the curved portion 554 of the "c" glyph 552. The grayscale value of the first pixel may be decreased to generate an adjusted first pixel 564, and the grayscale value of the second pixel may be decreased to generate an adjusted second pixel 566. Similarly, the grayscale value of the third pixel may be decreased to generate an adjusted third pixel 568, and the grayscale value of the fourth pixel may be decreased to generate an adjusted fourth pixel 570. The appearance of the "c" glyph 552 may therefore appear with added contrast to the operator 502.

Figure 7:
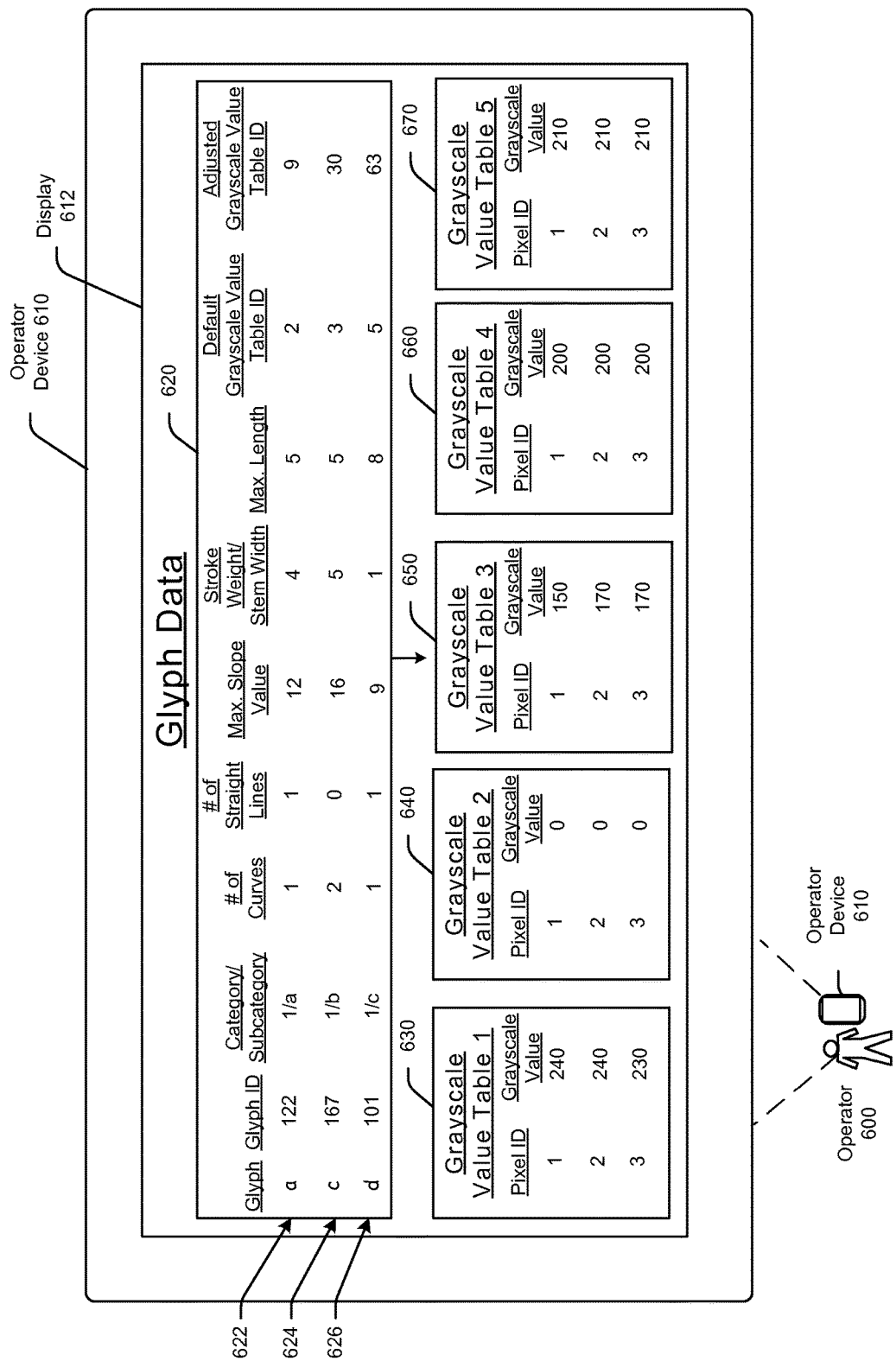
FIG. 7 is a schematic illustration of an example grayscale mapping table for dynamic contrast adjustments for glyph rendering in accordance with one or more example embodiments of the disclosure.

FIG. 7 illustrates an example embodiment of glyphs data in accordance with one or more embodiments of the disclosure. For example, an operator 600 may operate an operator device 610, which may be the same as, or different than, the operator devices 110, 210, 410, 510. The operator device 610 may include a display 612 and may be operable to identify glyph data 620. For example, font files used by the operator device 610 to render fonts may include glyph data. The glyph data 620 may include information for some or all of the glyphs and font sizes associated with the font. For example, the glyph data 620 may include glyph information 622 for an "a" glyph, glyph information 624 for a "c" glyph, glyph information 626 for a "d" glyph, and so forth. The font file and/or glyph data 620 may further include, or be associated with, various grayscale value tables that may be used by the operator device 610 to render one or more glyphs. For example, a first grayscale table 630 may have a first table index value and may be associated with particular glyphs. Similarly, a second grayscale table 640, a third grayscale table 650, a fourth grayscale table 660, and a fifth grayscale table 660 may be associated with various glyphs and/or font sizes. References between glyphs and grayscale tables may be modified by embodiments of the disclosure to adjust contrasts for one or more glyphs.

One or more operations of the method 300 or use cases of FIGS. 1-6 may have been described above as being performed by a user device, or more specifically, by one or more program modules, applications, or the like executing on a device. It should be appreciated, however, that any of the operations of method 300 or use cases of FIGS. 1-6 may be performed, at least in part, in a distributed manner by one or more other devices, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the method 300 or use cases of FIGS. 1-6 may be described in the context of the illustrative devices, it should be appreciated that such operations may be implemented in connection with numerous other device configurations.

The operations described and depicted in the illustrative method and use cases of FIGS. 1-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

FIG. 8 is a schematic block diagram of an illustrative operator device 700 in accordance with one or more example embodiments of the disclosure. The operator device 700 may include any suitable computing device including, but not limited to, a mobile device such as a smartphone, tablet, e-reader, wearable device, or the like; a desktop computer; a laptop computer; a content streaming device; a set-top box; or the like. The operator device 700 may correspond to an illustrative device configuration for the operator devices 110, 210, 410, 510, 610 of FIGS. 1-6.

The device 700 may be configured to communicate via one or more networks (not shown) with one or more servers, user or operator devices, or the like. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the device 700 may include one or more processors (processor(s)) 702, one or more memory devices 704 (generically referred to herein as memory 704), one or more input/output ("I/O") interface(s) 706, one or more network interfaces 708, one or more sensors or sensor interfaces 710, one or more transceivers 712, and data storage 716. The device 700 may further include one or more buses 714 that functionally couple various components of the device 700. The device 700 may further include one or more antennas 740 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 714 may include at least one of a system bus, a memory bus, an address bus, or a message bus, and may permit exchange of information (e.g., data (including computer-executable code), signaling, etc.) between various components of the device 700. The bus(es) 714 may include, without limitation, a memory bus or a memory controller, a peripheral bus, an accelerated graphics port, and so forth. The bus(es) 714 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 704 of the device 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 716 may include removable storage and/or non-removable storage including, but not limited to, magnetic storage, optical disk storage, and/or tape storage. The data storage 716 may provide non-volatile storage of computer-executable instructions and other data. The memory 704 and the data storage 716, removable and/or non-removable, are examples of computer-readable storage media (CRSM) as that term is used herein.

The data storage 716 may store computer-executable code, instructions, or the like that may be loadable into the memory 704 and executable by the processor(s) 702 to cause the processor(s) 702 to perform or initiate various operations. The data storage 716 may additionally store data that may be copied to memory 704 for use by the processor(s) 702 during the execution of the computer-executable instructions. Moreover, output data generated as a result of execution of the computer-executable instructions by the processor(s) 702 may be stored initially in memory 704, and may ultimately be copied to data storage 716 for non-volatile storage.

More specifically, the data storage 716 may store one or more operating systems (O/S) 718, one or more database management systems (DBMS) 720, and one or more program modules, applications, or the like such as, for example, one or more category generation module(s) 722, one or more contrast adjustment module(s) 724, one or more font file generation module(s) 726, and one or more rendering module(s) 728. Any of the program modules may include one or more sub-modules. Any of the modules depicted in FIG. 8 may include computer-executable code, instructions, or the like that may be loaded into the memory 704 for execution by one or more of the processor(s) 702. Further, any data stored in the data storage 716 may be loaded into the memory 704 for use by the processor(s) 702 in executing computer-executable code. In addition, any data potentially stored in one or more datastore(s) 732 may be accessed via the DBMS 720 and loaded in the memory 704 for use by the processor(s) 702 in executing computer-executable code. In the illustrated example, the datastore(s) 732 may include digital content 734, such as eBook content, text content, or other digital content. Digital content, such as an eBook or other digital work may be formatted or delivered to the operator device 700 as a distribution package, containing book text and/or other content and multiple synopses. The digital content may be stored as digital content data 734 in the datastore(s) 732. The digital content data 734 may include the text of the digital work as well as accompanying illustrations, diagrams, pictures, or other associated content. The digital content data 734 may also include or comprise objects other than text, such as illustrations, diagrams, pictures, drawings, or other non-text items of a digital work.

The datastore(s) 732 may include glyph data 736, which may be part of a font file or may include a font file and may include information related to some or all glyphs associated with one or more fonts. The datastore(s) 732 may include one or more rendering rule(s) 738, which may be used, for example, by the rendering module(s) 728 to render the digital content.

The processor(s) 702 may be configured to access the memory 704 and execute computer-executable instructions loaded therein. For example, the processor(s) 702 may be configured to execute computer-executable instructions of the various program modules of the operator device 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to functionality supported by the various program modules depicted in FIG. 8, the category generation module(s) 722 may include computer-executable instructions, code, or the like that responsive to execution by one or more of the processor(s) 702 may perform functions including, but not limited to, identifying and/or generating glyph categories and subcategories. Computer-executable instructions of the category generation module(s) 722 may be executed to identify category exceptions and to identify glyphs eligible for contrast adjustments.

The contrast adjustment module(s) 724 may include computer-executable instructions, code, or the like that responsive to execution by one or more of the processor(s) 702 may perform functions including, but not limited to, adjusting a contrast of one or more glyphs, for example by adjusting a grayscale value associated with one or more glyphs. The contrast adjustment module(s) 724 may further include computer-executable instructions, code, or the like that responsive to execution by one or more of the processor(s) 702 propagates contrast adjustments to other glyphs.

The font file generation module(s) 726 may include computer-executable instructions, code, or the like that responsive to execution by one or more of the processor(s) 702 may perform functions including, but not limited to, generating font files with adjusted contrast or grayscale values for certain glyphs. Computer-executable instructions of the font file generation module(s) 726 may be executed to link or map certain grayscale tables to certain glyphs.

The rendering module(s) 728 may include computer-executable instructions, code, or the like that responsive to execution by one or more of the processor(s) 702 may perform functions including, but not limited to, render digital content on a display of the device.

Referring now to other illustrative components depicted as being stored in the data storage 716, the O/S 718 may be loaded from the data storage 716 into the memory 704 and may provide an interface between other application software executing on the device 700 and hardware resources of the device 700. More specifically, the O/S 718 may include a set of computer-executable instructions for managing hardware resources of the device 700 and for providing common services to other application programs (e.g., managing memory allocation among various application programs). In certain example embodiments, the O/S 718 may control execution of the other program modules to dynamically enhance characters for content rendering. The O/S 718 may include any operating system now known or which may be developed in the future including, but not limited to, any server operating system, any mainframe operating system, or any other proprietary or non-proprietary operating system.

The DBMS 720 may be loaded into the memory 704 and may support functionality for accessing, retrieving, storing, and/or manipulating data stored in the memory 704 and/or data stored in the data storage 716. The DBMS 720 may use any of a variety of database models (e.g., relational model, object model, etc.) and may support any of a variety of query languages. The DBMS 720 may access data represented in one or more data schemas and stored in any suitable data repository including, but not limited to, databases (e.g., relational, object-oriented, etc.), file systems, flat files, distributed datastore(s) in which data is stored on more than one node of a computer network, peer-to-peer network datastore(s), or the like. In those example embodiments in which the device 700 is a mobile device, the DBMS 720 may be any suitable light-weight DBMS optimized for performance on a mobile device.

Referring now to other illustrative components of the device 700, one or more input/output (I/O) interfaces 706 may be provided that may facilitate the receipt of input information by the device 700 from one or more I/O devices as well as the output of information from the device 700 to the one or more I/O devices. The I/O devices may include, for example, one or more user interface devices that facilitate interaction between a user and the device 700 including, but not limited to, a display, a keypad, a pointing device, a control panel, a touch screen display, a gesture capture or detection device, a remote control device, a microphone, a speaker, and so forth. The I/O devices may further include, for example, any number of peripheral devices such as data storage devices, printing devices, and so forth.

The device 700 may further include one or more network interfaces 708 via which the device 700 may communicate with any of a variety of other systems, platforms, networks, devices, and so forth. Such communication may occur via any of the types of networks previously described.

The antenna(s) 740 may include any suitable type of antenna depending, for example, on the communications protocols used to transmit or receive signals via the antenna(s) 740. Non-limiting examples of suitable antennas may include directional antennas, non-directional antennas, dipole antennas, folded dipole antennas, patch antennas, multiple-input multiple-output (MIMO) antennas, or the like. The antenna(s) 740 may be communicatively coupled to one or more transceivers 712 or radio components to which or from which signals may be transmitted or received.

As previously described, the antenna(s) 740 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 740 may additionally, or alternatively, include a Wi-Fi antenna configured to transmit or receive signals in accordance with established standards and protocols, such as the IEEE 802.11 family of standards, including via 2.4 GHz channels (e.g. 802.11b, 802.11g, 802.11n), 5 GHz channels (e.g. 802.11n, 802.11ac), or 80 GHZ channels (e.g. 802.11ad). In alternative example embodiments, the antenna(s) 740 may be configured to transmit or receive radio frequency signals within any suitable frequency range forming part of the unlicensed portion of the radio spectrum.

The antenna(s) 740 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(s) 740—transmitting or receiving radio frequency (RF) signals in the bandwidth and/or channels corresponding to the communications protocols utilized by the device 700 to communicate with other devices. The transceiver(s) 712 may include hardware, software, and/or firmware for modulating, transmitting, or receiving—potentially in cooperation with any of antenna(s) 740—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the device 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, motion sensors, thermal sensors, cameras, and so forth. Example types of inertial sensors may include accelerometers (e.g., MEMS-based accelerometers), gyroscopes, and so forth. In one example, the user devices described herein may include a motion sensor configured to detect an event corresponding to device motion via the motion sensor. Such events may be continuous motion for a certain length of time, which may indicate that the user device is not stationary (e.g., the user using the user device is in a car, etc.).

It should be appreciated that the program modules, applications, computer-executable instructions, code, or the like depicted in FIG. 8 as being stored in the data storage 716 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the device 700, and/or hosted on other computing device(s) accessible via one or more networks, may be provided to support functionality provided by the program modules, applications, or computer-executable code depicted in FIG. 8 and/or additional or alternate functionality. Further, functionality may be modularized differently such that processing described as being supported collectively by the collection of program modules depicted in FIG. 8 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 8 may be implemented, at least partially, in hardware and/or firmware across any number of devices.

It should further be appreciated that the device 700 may include alternate and/or additional hardware, software, or firmware components beyond those described or depicted without departing from the scope of the disclosure. More particularly, it should be appreciated that software, firmware, or hardware components depicted as forming part of the device 700 are merely illustrative and that some components may not be present or additional components may be provided in various embodiments. While various illustrative program modules have been depicted and described as software modules stored in data storage 716, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
   identifying, by a computer system comprising one or more processors, a font in which text is to be rendered on a display of an electronic device;
   identifying a first glyph associated with the font;
   determining that the first glyph comprises a first number of curved portions forming the first glyph;
   identifying a second glyph associated with the font;
   determining that the second glyph comprises a second number of curved portions forming the second glyph;
   determining that the first number of curved portions and the second number of curved portions are within a first range of curved portion values, wherein the first range of curved portion values corresponds to a first glyph category;
   rendering the first glyph on the display;
   rendering the second glyph on the display;
   receiving a request to increase a first contrast of the first glyph;
   increasing the first contrast by reducing a first grayscale value of the first glyph by an incremental amount, wherein the incremental amount is a numerical value;
   automatically increasing a second contrast of the second glyph by reducing a second grayscale value of the second glyph by the incremental amount;
   assigning the reduced first grayscale value to the first glyph in a grayscale mapping table;
   assigning the reduced second grayscale value to the second glyph in the grayscale mapping table; and
   generating a font file comprising the first glyph, the second glyph, and the grayscale mapping table.

2. The method of claim 1, further comprising:
   generating the first glyph category comprising a group of glyphs having a number of curved portions within the first range of curved portion values, the first glyph category comprising the first glyph, the second glyph, and a third glyph;
   calculating a difference between a first slope value of a first curved portion of the first glyph and a second slope value of a second curved portion of the third glyph;
   determining that the difference meets a subcategory generation threshold;
   generating, based on the subcategory generation threshold, a first subcategory of the first glyph category, the first subcategory comprising the first glyph, the second glyph, and a first subgroup of glyphs having a curved portion with the first slope value;
   generating, based on the subcategory generation threshold, a second subcategory of the first glyph category, the second subcategory comprising the third glyph and a second subgroup of glyphs having a curved portion with the second slope value;
   rendering the third glyph and the second subgroups of glyphs on the display;
   increasing a third contrast of the third glyph by reducing a third grayscale value of the third glyph by the incremental amount;
   automatically increasing a fourth contrast of a fourth glyph in the second subgroup of glyphs by reducing a fourth grayscale value of the fourth glyph by the incremental amount; and
   assigning the reduced third grayscale value to the third glyph and the reduced fourth grayscale value to the fourth glyph in the grayscale mapping table.

3. The method of claim 1, further comprising:
   determining that a minimum distance between a first curved portion and a second curved portion of an outline of the first glyph in a font size meets a contrast adjustment threshold; and
   rendering the first glyph in the font size on the display.

4. The method of claim 1, wherein the first glyph and the second glyph are rendered in a font size, further comprising:
   receiving a render request to render text content on the display of the electronic device;
   determining that the text content comprises the first glyph and the second glyph in the font size; and
   rendering the text content with the grayscale mapping table by rendering the first glyph with the reduced first grayscale value and the second glyph with the reduced second grayscale value.

5. A method comprising:
   rendering, by a computer system comprising one or more processors, a first glyph associated with a font in a first font size;
   increasing a first contrast of the first glyph in the first font size by adjusting a first grayscale value associated with the first glyph in the first font size to generate an adjusted first grayscale value;
   storing the adjusted first grayscale value in a grayscale mapping table associated with the font, the grayscale mapping table comprising a default grayscale value for the first glyph in a second font size; and
   generating a font file comprising the first glyph and the grayscale mapping table, wherein the grayscale mapping table comprises a first glyph identifier of the first glyph associated with a default grayscale table identifier that includes the first grayscale value, and wherein the grayscale mapping table comprises the first glyph identifier associated with an adjusted grayscale value table identifier that includes the adjusted first grayscale value.

6. The method of claim 5, further comprising:
generating a first glyph category comprising a first group of glyphs in the first font size having a number of curved portions within a range of curved portion values, the first group comprising the first glyph and a second glyph, wherein rendering the first glyph comprises rendering the first group of glyphs;
automatically increasing a second contrast of the second glyph by adjusting a second grayscale value associated with the second glyph in the first font size to generate an adjusted second grayscale value; and
storing the adjusted second grayscale value in the grayscale mapping table.

7. The method of claim 6, further comprising:
determining that a difference between a first curve slope value of a first curve of the first glyph and a second curve slope value of a second curve of the second glyph meets a subcategory generation threshold;
generating a first subcategory of the first glyph category comprising the first glyph; and
generating a second subcategory of the first glyph category comprising the second glyph.

8. The method of claim 6, further comprising:
determining, by the computer system, that a difference between a first curve length value of a first curve of the first glyph and a second curve length value of a second curve of the second glyph meets a subcategory generation threshold;
generating a first subcategory of the first glyph category comprising the first glyph; and
generating a second subcategory of the first glyph category comprising the second glyph.

9. The method of claim 5, further comprising:
determining a stroke weight indicative of a thickness between a first curve and a second curve of the first glyph; and
determining that the stroke weight meets a contrast adjustment threshold prior to rendering the first glyph.

10. The method of claim 5, further comprising:
generating a first glyph category comprising a first group of glyphs in the first font size having a number of straight line portions within a range of straight line portion values, the first group comprising the first glyph and a second glyph, wherein rendering the first glyph comprises rendering the first group of glyphs;
automatically increasing a second contrast of the second glyph by adjusting a second grayscale value associated with the second glyph in the first font size to generate an adjusted second grayscale value; and
storing the adjusted second grayscale value in the grayscale mapping table.

11. The method of claim 5, further comprising:
identifying a font size restriction value associated with the font, the font size restriction value indicative of a maximum font size at which a contrast is adjustable; and
determining that the first font size is less than or equal to the font size restriction value.

12. The method of claim 5, further comprising:
receiving a request to render text content comprising the first glyph in the first font size and the first glyph in the second font size;
identifying a first glyph identifier associated with the first glyph in the first font size;
determining that the first glyph identifier is associated with the adjusted first grayscale value; and
rendering the first glyph in the first font size based at least in part on the adjusted first grayscale value and the first glyph in the second font size based at least in part on the default grayscale value using the font file.

13. The method of claim 5, further comprising:
determining that the first glyph comprises a curved line portion; and
increasing the first contrast by adjusting the first grayscale value by a first incremental amount, wherein the first incremental amount is greater than a second incremental amount for contrast adjustments to glyphs with straight line portions.

14. The method of claim 11, further comprising:
requesting approval of the first grayscale value; and
receiving a confirmation indication confirming that the first grayscale value is approved.

15. The method of claim 5, further comprising:
determining that the font is a true type font; and
modifying a true type grayscale value of the first glyph to correspond to the adjusted first grayscale value.

16. The method of claim 5, further comprising:
rendering the first glyph in the first font size on a first line of text; and
rendering the first glyph in the second font size on a second line of text, wherein the second font size is greater than the first font size.

17. A device, comprising:
at least one memory storing computer-executable instructions; and
at least one processor communicatively coupled to the at least one memory and the display and configured to access the at least one memory and execute the computer-executable instructions to:
render a first glyph associated with a font in a first font size;
increase a first contrast of the first glyph in the first font size by adjusting a first grayscale value associated with the first glyph in the first font size to generate an adjusted first grayscale value;
store the adjusted first grayscale value in a grayscale mapping table associated with the font, the grayscale mapping table comprising a default grayscale value for the first glyph in a second font size; and
generate a font file comprising the first glyph and the grayscale mapping table wherein the grayscale mapping table comprises a first glyph identifier of the first glyph associated with a default grayscale table identifier that includes the first grayscale value, and wherein the grayscale mapping table comprises the first glyph identifier associated with an adjusted grayscale value table identifier that includes the adjusted first grayscale value.

18. The device of claim 17, wherein the at least one processor is further configured to execute the computer-executable instructions to:
generate a first glyph category comprising a first group of glyphs in the first font size having a number of curved portions within a range of curved portion values, the first group comprising the first glyph and a second glyph, wherein rendering the first glyph comprises rendering the first group of glyphs;

automatically increase a second contrast of the second glyph by adjusting a second grayscale value associated with the second glyph in the first font size to generate an adjusted second grayscale value; and store the adjusted second grayscale value in the grayscale mapping table.

19. The device of claim 17, wherein the at least one processor is further configured to execute the computer-executable instructions to:

generate a first glyph category comprising a first group of glyphs in the first font size having a number of straight line portions within a range of straight line portion values, the first group comprising the first glyph and a second glyph, wherein rendering the first glyph comprises rendering the first group of glyphs;

automatically increase a second contrast of the second glyph by adjusting a second grayscale value associated with the second glyph in the first font size to generate an adjusted second grayscale value; and store the adjusted second grayscale value in the grayscale mapping table.

20. The device of claim 17, wherein the at least one processor is further configured to execute the computer-executable instructions to:

receive a request to render text content comprising the first glyph in the first font size and the first glyph in the second font size;

identify a first glyph identifier associated with the first glyph in the first font size;

determine that the first glyph identifier is associated with the adjusted first grayscale value; and render the first glyph in the first font size based at least in part on the adjusted first grayscale value and the first glyph in the second font size based at least in part on the default grayscale value using the font file.

* * * * *